(12) United States Patent
Maglaras

(10) Patent No.: US 6,497,547 B1
(45) Date of Patent: Dec. 24, 2002

(54) CONTAINERIZED REFUSE COLLECTION TRUCK

(75) Inventor: Nicholas Maglaras, Flushing, NY (US)

(73) Assignees: Nicholas J. Maglaras, Flushing, NY (US); Marianne R. Maglaras, Flushing, NY (US)

( * ) Notice: Subject to any disclaimer, the term of this patent is extended or adjusted under 35 U.S.C. 154(b) by 0 days.

(21) Appl. No.: 09/748,836

(22) Filed: Dec. 27, 2000

Related U.S. Application Data

(60) Provisional application No. 60/173,424, filed on Dec. 29, 1999, and provisional application No. 60/189,991, filed on Mar. 17, 2000.

(51) Int. Cl.[7] ............................. B65F 3/20; B65F 3/28
(52) U.S. Cl. ................ 414/525.2; 414/517; 414/525.5; 414/498
(58) Field of Search ............................. 100/215, 233; 414/511, 513, 514, 515, 516, 517, 525.2, 525.3, 525.5, 525.6, 498

(56) References Cited

U.S. PATENT DOCUMENTS

| | | | | |
|---|---|---|---|---|
| 3,365,087 A | * | 1/1968 | Roedel | 414/505 |
| 3,380,600 A | | 4/1968 | Klanner et al. | |
| 3,756,438 A | * | 9/1973 | Steltz | 414/525.5 |
| 3,759,406 A | * | 9/1973 | Nickel | 100/233 |
| 3,788,501 A | * | 1/1974 | Steltz | 100/233 |
| 3,799,374 A | | 3/1974 | Weaver | |
| 3,881,613 A | | 5/1975 | Torimoto et al. | |
| 4,041,857 A | * | 8/1977 | Weeks | 100/215 |
| 4,088,071 A | | 5/1978 | Cruse et al. | |
| 4,096,959 A | * | 6/1978 | Schaffler | 414/408 |
| 4,121,725 A | * | 10/1978 | Demenais | 296/122 |
| 4,128,054 A | * | 12/1978 | Chenot | 100/233 |
| 4,257,322 A | * | 3/1981 | McDermott | 100/229 A |
| 4,473,333 A | * | 9/1984 | Stuart | 100/233 |
| 4,487,120 A | | 12/1984 | Barstow | |
| 4,841,853 A | | 6/1989 | Wallace | |
| 4,934,896 A | | 6/1990 | Quinto | |
| 4,986,716 A | * | 1/1991 | Winter | 100/218 |
| 5,064,332 A | | 11/1991 | Edelhoff et al. | |
| 5,076,159 A | * | 12/1991 | Vedeo et al. | 100/233 |
| 5,193,453 A | | 3/1993 | Lundy | |
| 5,447,361 A | | 9/1995 | Phillips | |
| 5,829,946 A | | 11/1998 | McNeilus et al. | |
| 5,938,393 A | * | 8/1999 | Georg | 414/408 |
| 6,036,275 A | | 3/2000 | Hansen et al. | |

* cited by examiner

Primary Examiner—James W. Keenan
(74) Attorney, Agent, or Firm—Hoffmann & Baron, LLP

(57) ABSTRACT

A containerized refuse collection truck that generally includes a cab having a chassis extending rearwardly therefrom, a compactor unit attached to a rear end of the chassis and a refuse container removably attached to the chassis between the cab and the compactor unit. The refuse container includes a door hingedly connected to a rear end of the container for swinging downwardly into the compactor unit in an open position. The door is driven by a piston of the compactor unit from its open position for receiving refuse on said door to a closed position for compacting the refuse within the container. The removable refuse container also preferably includes a removable ejector assembly positioned within the container at a front end thereof for ejecting refuse within the container out through the rear end of the container.

20 Claims, 15 Drawing Sheets

FIG. 15 STEPS IN PACKING CYCLE (PRIOR ART)

CONTAINERIZED REFUSE COLLECTION TRUCK

CROSS-REFERENCE TO RELATED APPLICATIONS

This application claims the benefit of U.S. Provisional Application No. 60/173,424, filed Dec. 29, 1999 and U.S. Provisional Application No. 60/189,991 filed Mar. 17, 2000.

FIELD OF THE INVENTION

The present invention relates generally to a refuse collection vehicle and more particularly to a refuse collection truck having a removable refuse container for separate dumping of the refuse apart from the truck.

BACKGROUND OF THE INVENTION

The conventional practice for municipal refuse collection services is to collect curbside garbage into a refuse collection truck where it is compacted into the body of the truck. When the truck is full it travels to a common refuse dumping site where the truck is emptied. The dumping site may be an intermediate dumping site, such as a dock for an open barge, or a final dumping site, such as a landfill. In either case, the site is typically remote from the truck's collection route. At intermediate sites, large payloaders often scoop up the deposited garbage and transfer it into large earthmover type trucks, which in turn convey the garbage or refuse to a barge or directly to the final dumping site.

One of the several disadvantages of the conventional system is the "down time" of the collection truck while the collection truck is in transit between its collection route and the common dumping site. In other words, the collection truck is no longer in service for collection while it is traveling to the dumping site. Furthermore, should a loaded truck break down for any reason, the refuse contents of the truck would have to be unloaded, often manually, before repairs could be undertaken. Another disadvantage of the conventional practice is the typical requirement for an intermediate dumping site for the individual collection trucks and the rather expensive equipment required for the intermediate dumping site to transfer the garbage to the next link of the disposal chain. Open dumping of refuse at common dumping sites also has the added unsanitary drawbacks of odors, spillage and the congregation of seagulls and vermin.

Accordingly, it is desirable to provide a refuse collection system, which minimizes the down time of the collection truck, eases loading and unloading of the truck and eliminates the problems associated with open intermediate dumping sites.

SUMMARY OF THE INVENTION

The present invention is a containerized refuse collection truck including a conventional refuse collection truck cab and chassis but having a removable refuse container. When the collection truck of the present invention is full, the refuse container may be removed at a local transfer station and replaced with a new refuse container in a minimal amount of time so that the truck may continue its collection route with a minimum of down time. The full refuse containers may be then transported from the local transfer station to a landfill or barge by container carrying trucks or by rail. If transported to a barge, the container itself may be loaded onto the barge and conveyed to the final dumping site where it is emptied and returned to the local transfer station. When transporting containerized refuse, the problems associated with intermediate dumping sites and open barges are eliminated.

The containerized refuse collection truck of the present invention generally includes a cab having a chassis extending rearwardly therefrom, a compactor unit attached to a rear end of the chassis and a refuse container removably attached to the chassis between the cab and the compactor unit. The refuse container includes a door hingedly connected to a rear end of the container for swinging downwardly into the compactor unit in an open position. The door is driven by a piston of the compactor unit from its open position for receiving refuse on said door to a closed position for compacting the refuse within the container. The piston of the compactor unit may be removably connected to the door for driving the door directly or it may be connected to a driver door upon which the door is seated for driving the door between its open and closed positions.

In a preferred embodiment, the container door is hingedly connected to an outward swinging rear wall of the container, wherein the swinging rear wall of the container allows for emptying of the container. The refuse container also preferably includes an ejector assembly positioned within the container at a front end thereof for ejecting refuse within the container out through the rear end of the container. The ejector assembly preferably comprises a frame, an ejector piston connected at one end to the frame and an ejector blade connected to an opposite end of the ejector piston for pushing refuse rearwardly out through the rear end of the container. The frame is releasably fastened to the container such that the ejector assembly is removable from the container.

Preferably, the chassis further includes at least one lock cooperating with at least one correspondingly sized key-hole provided on the container for alternately securing and releasing the container. The container door further preferably includes upstanding walls forming a pocket for receiving the refuse on the door. The two upstanding side walls increase in height in a direction away from the hinged connection of the container door for aiding in the compaction of the refuse within the container.

A preferred embodiment of a containerized refuse collection truck, as well as other features and advantages of this invention will be apparent from the following detailed description which is to be read in conjunction with the accompanying drawings.

DETAILED DESCRIPTION OF THE PREFERRED EMBODIMENTS

Figure 1:
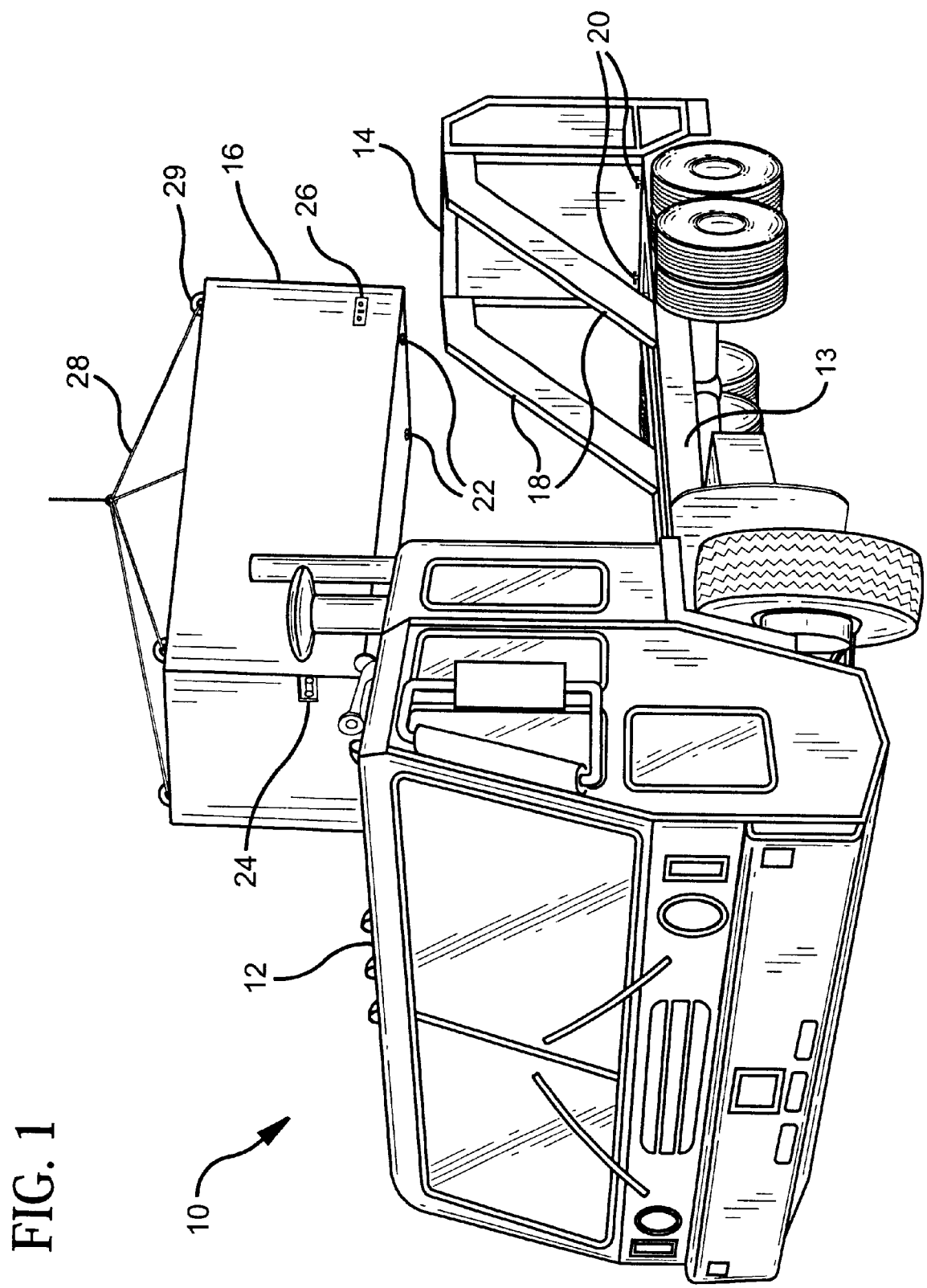
FIG. 1 is a front prospective view of the containerized refuse collection truck of the present invention.
Figure 2:
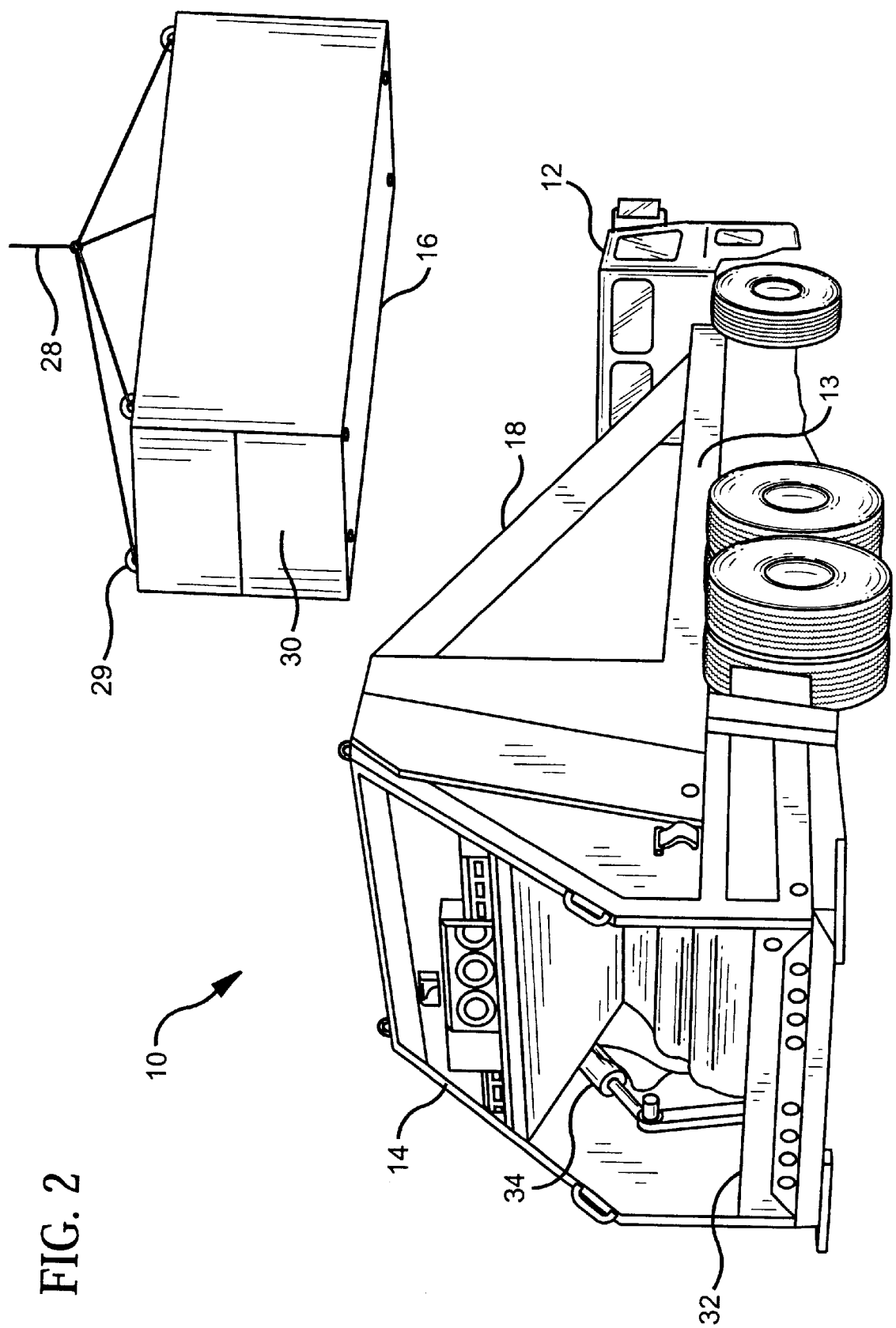
FIG. 2 is a rear perspective view of the containerized refuse collection truck of FIG. 1.
Figure 3:
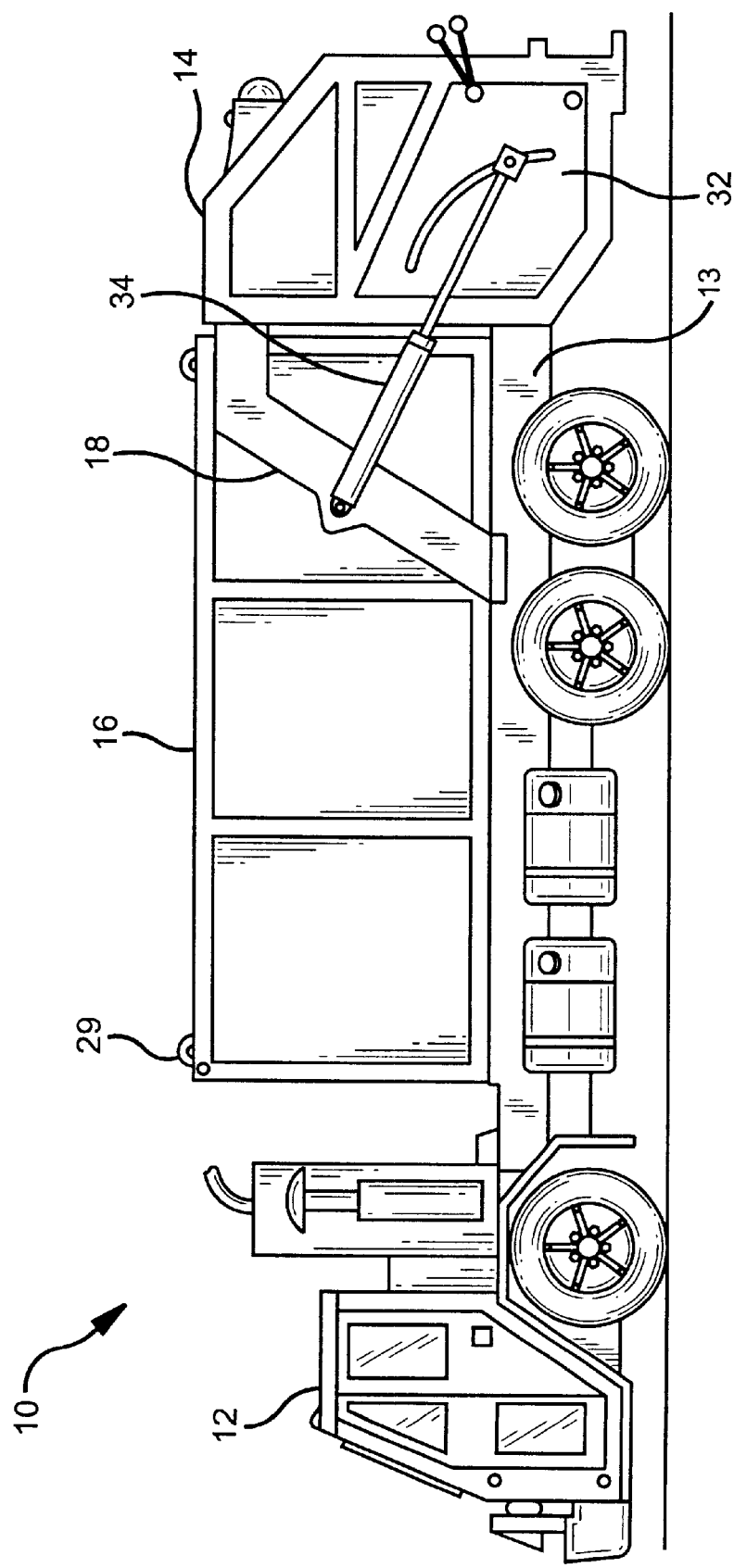
FIG. 3 is a side view of the containerized refuse collection truck of FIG. 1.

Referring first to FIGS. 1–3, a containerized refuse collection truck according to the present invention is shown. The containerized truck 10 generally includes a conventional cab 12, a chassis 13 extending rearwardly from the cab, a rear compactor unit 14 attached to the rear end of the chassis and a removable refuse container 16 attached to the chassis between the cab and the rear compactor unit.

The cab 12 and chassis 13 may be of any conventional truck design. Positioned at the rear of the chassis 13 is a rear compactor 14, which is similar in design to existing refuse collection truck compactors. Indeed, the containerized truck 10 of the present invention is preferably made by converting a conventional refuse collection truck by removing the central body portion thereof and supporting the rear compactor with structural supports 18 to the chassis 13. Thus, existing hydraulic lines and connections may be utilized.

Preferably, the removable container 16 is secured to the chassis 13 through the use of hydraulic locks 20 fitted into correspondingly sized key-holes 22 provided on the container. The key-holes 22 in the container 16 may be oval in shape and the hydraulic locks 20 may comprise rotatable T-bolts which fit within the oval holes and secure the container to the chassis 13 when rotated 90°. The container 16 is also provided with hydraulic quick-connects 24 and 26, which will be discussed in further detail below. When the container is full, the hydraulic quick-connects 24 and 26 are uncoupled and the hydraulic locks 20 are released. The container 16 may then be removed by a crane with a lifting rig 28 secured to eye-hooks 29 provided on the container.

Figure 4:
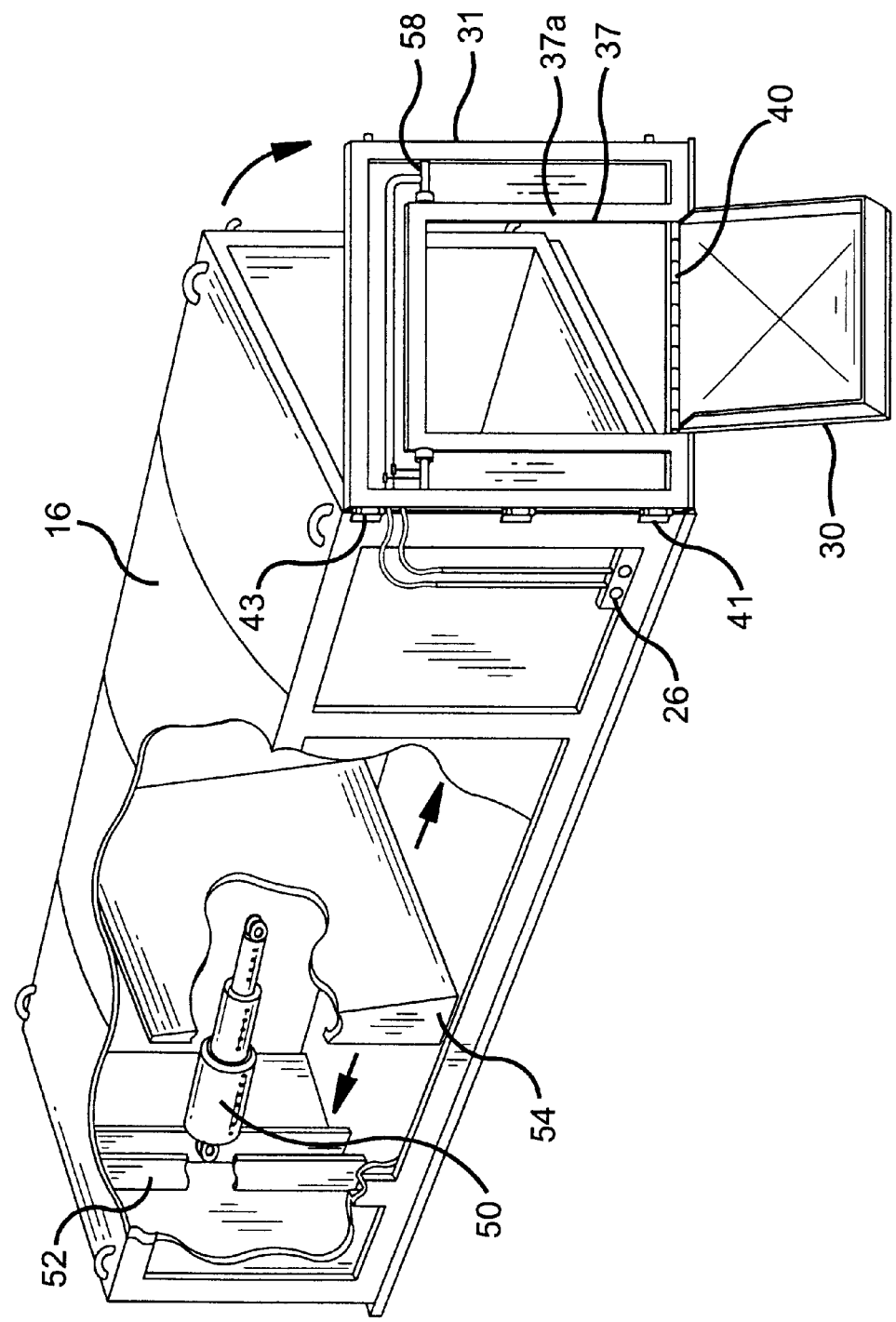
FIG. 4 is a perspective view of the container showing the preferred embodiment of the container doors.
Figure 5A:
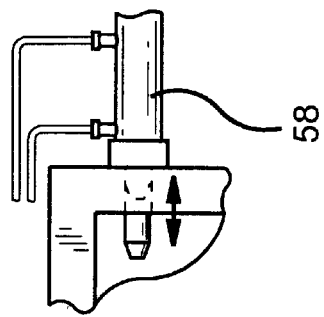
FIG. 5a is a detailed view of the hydraulic lock shown in FIG. 5.
Figure 5:
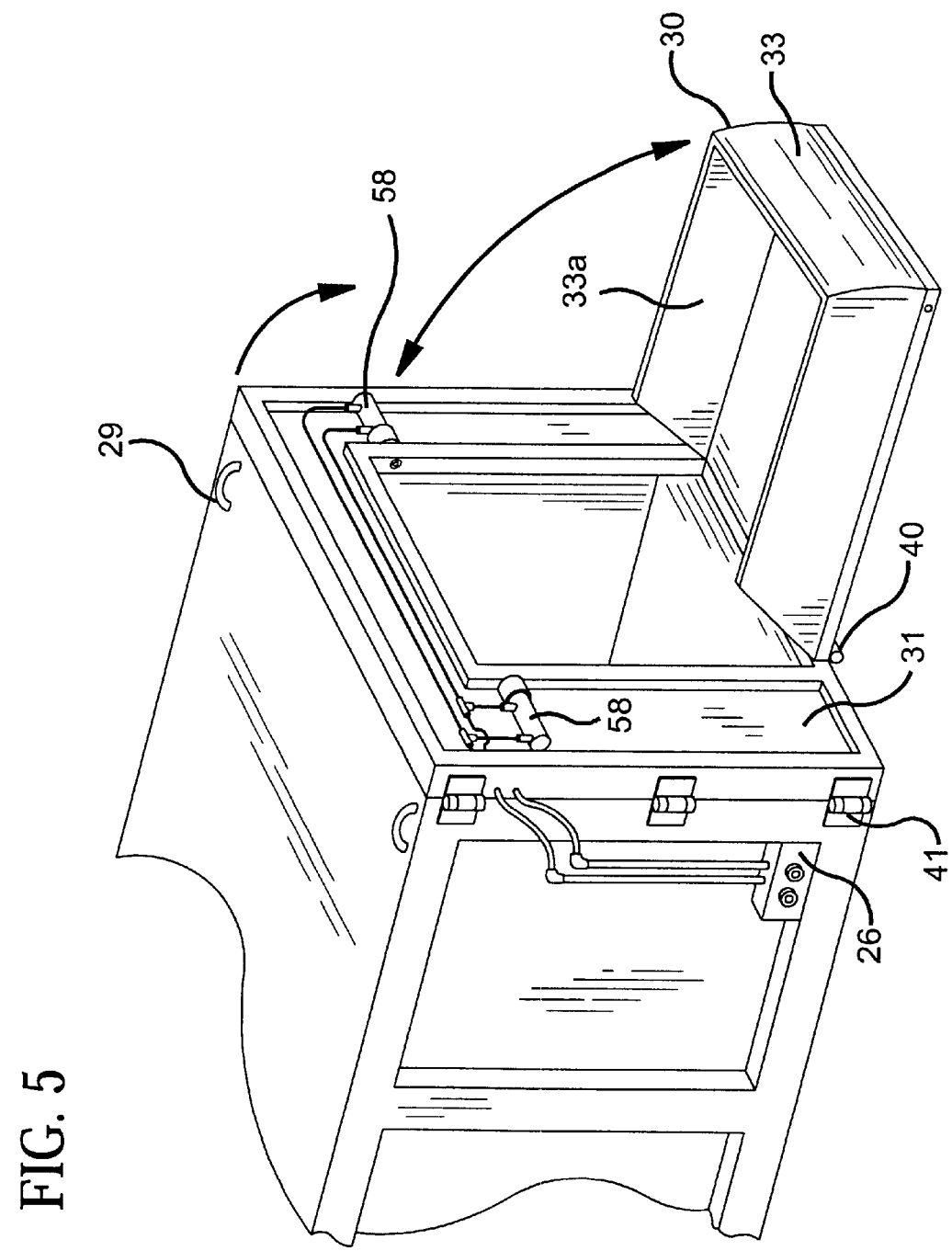
FIG. 5 is a rear perspective view of the preferred embodiment of the container doors.

The removable container 16 is made of reinforced steel and is provided with one or more hinged doors opening into the rear compactor 14. In the preferred embodiment as shown in FIGS. 4 and 5, the container 16 is provided with a downwardly swinging hinged inner door 30 and a laterally pivoting hinged outer door 31 connected to the rear of the container by hinges 40 and 41, respectively. The downwardly pivoting inner door 30 swings from an open position for receiving refuse to a closed position for compacting refuse within the container. When the inner door 30 is in its open position, it is received in the bottom well 32 of the rear compactor 14 and garbage may be dumped directly onto the door. The inner door 30 preferably includes three upstanding walls 33 which serve to contain the refuse dumped on the door and to aid in compaction of the refuse within the container 16 when the door closes. When the door 30 is fill, it is hydraulically closed to compact the garbage into the container. The sidewalls 33a preferably increase in height in a direction away from the hinge 40 so that the sidewalls will slice into the refuse in the container 16 as the door 30 closes.

Figure 6:
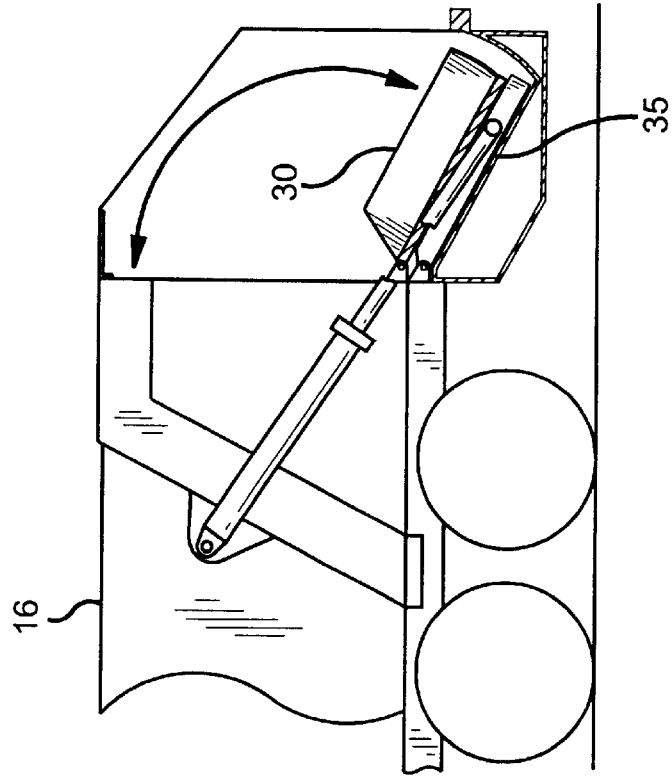
FIGS. 6 and 6a are side views of the rear compactor unit.
Figure 6A:
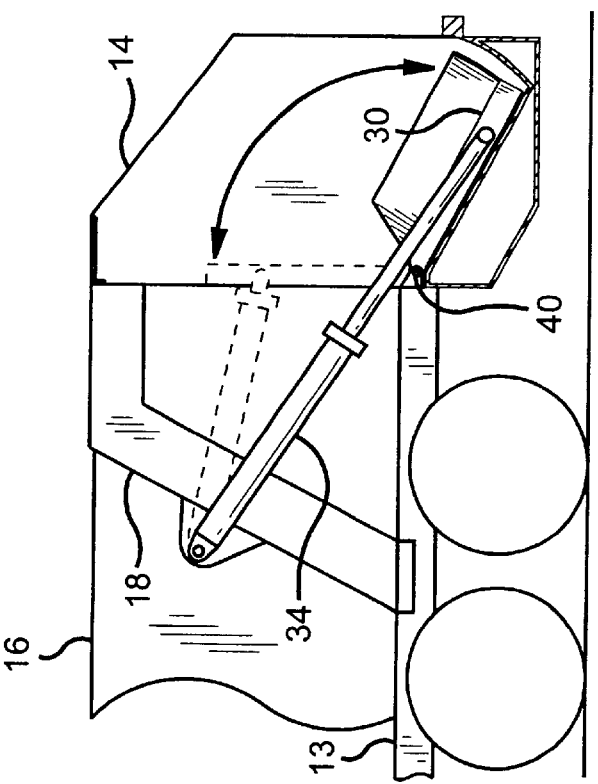
Figure 7:
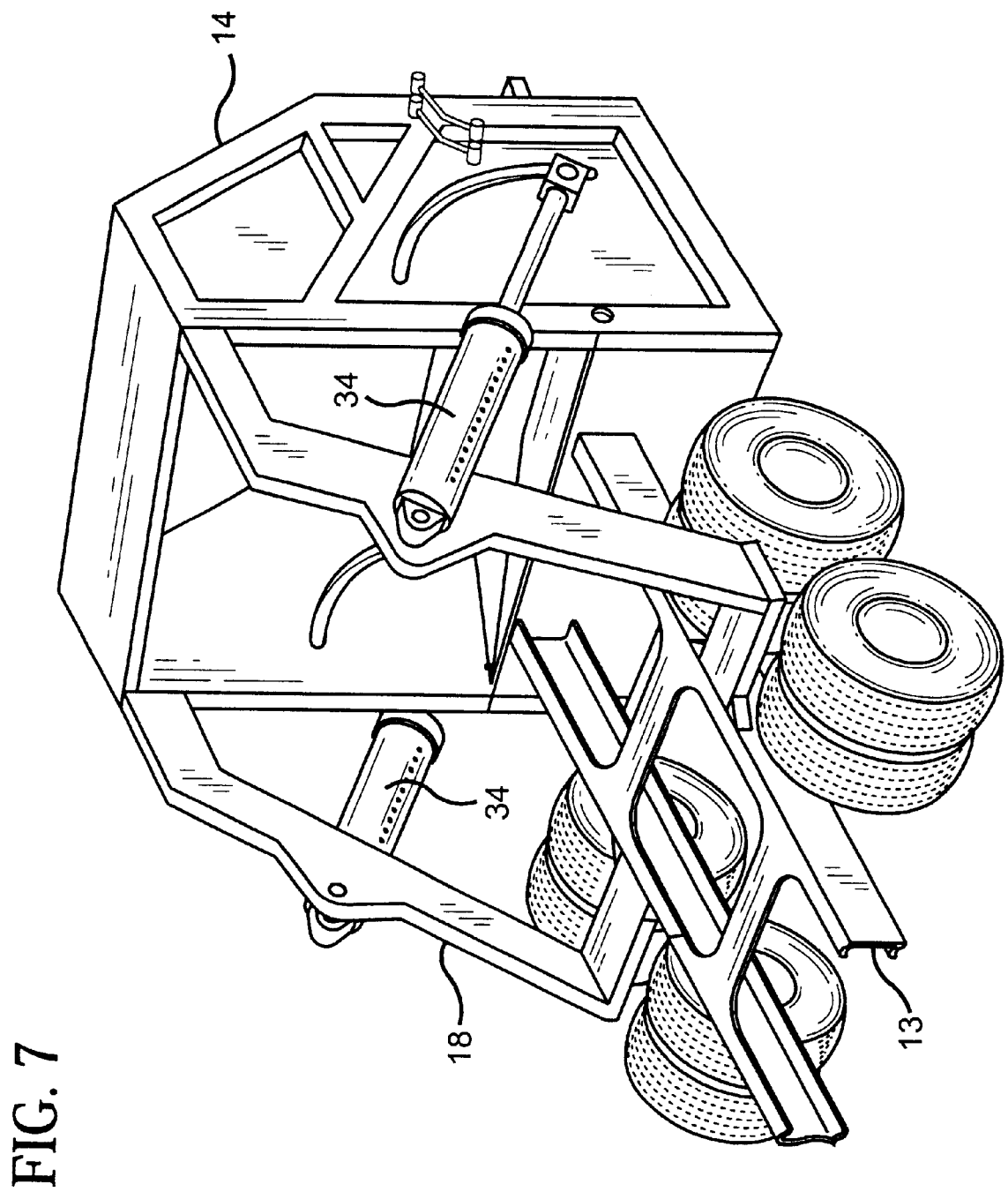
FIG. 7 is a perspective view of the rear compactor unit.
Figure 15:
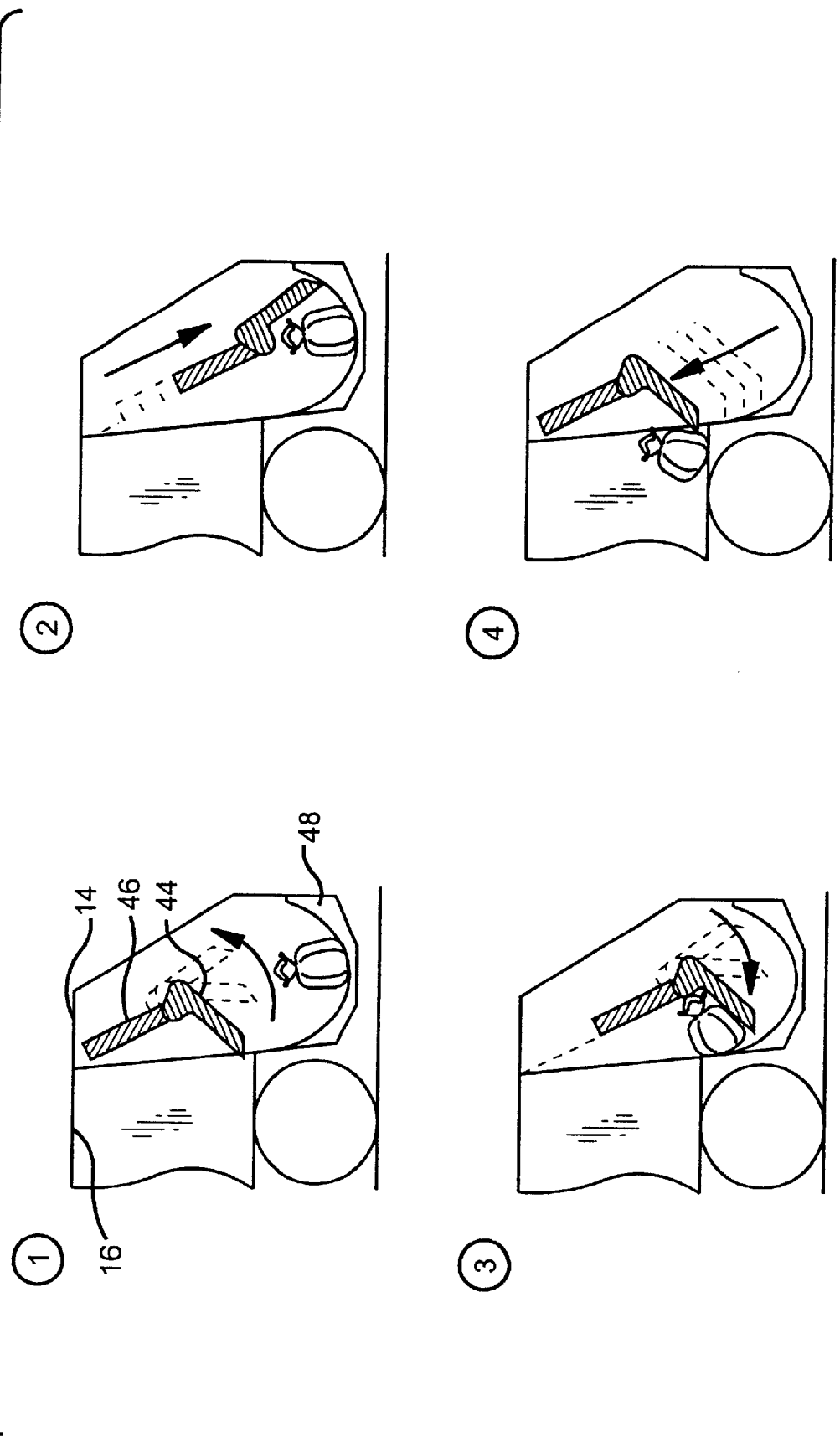
FIG. 15 schematically illustrates the operation of the rear compactor of a conventional refuse collection truck.

In the preferred embodiment as shown in FIGS. 6 and 7, the inner door 30 is detachably connected to one or more hydraulic pistons 34 of the rear compactor 14. Alternatively, the hydraulic pistons 34 may be permanently connected to a driver door 35 (shown in FIG. 6a) pivotally positioned below the container inner door 30 for driving the container door between its open and closed positions. By using the inner door 30 as the refuse compacting mechanism, only two hydraulic pistons 34 are needed as opposed to the four pistons required in conventional refuse collection trucks to drive a sweeper blade as shown in FIG. 15.

The laterally pivoting hinged outer door 31 is connected to the rear of the container by side hinges 41. The outer door 31 includes an opening 37 including a sealing flange 37a, preferably made from a flexible rubber material, for receiving the inner door 30 and sealing the contents of the container. When the container 16 is to be emptied, the outer door 31 is swung open to the side and the refuse may be ejected from the rear of the container.

The refuse container 16 is further provided with a telescoping hydraulic ejector piston 50 secured at one end to a front wall 52 of the container and having an ejector blade 54 fixed at an opposite end of the piston. As the container 16 begins to be loaded, the ejector piston 50 is in an extended position to provide a biasing force against the loaded refuse and thereby compacting the refuse as it is loaded. During further loading, the ejector piston 50 maintains a constant pressure against the loaded refuse but gradually retracts until the ejector blade 54 is positioned adjacent the front wall 52 of the container 16, when the container is full. When the container is to be emptied, hydraulic lines 56 from an on-site hydraulic system or from a transport truck are connected to the ejector quick connect 24. The telescoping hydraulic ejector piston 50 is activated causing the ejector piston and blade to move away from the front wall 52 of the container thereby causing the refuse to be ejected from the container.

Figure 8:
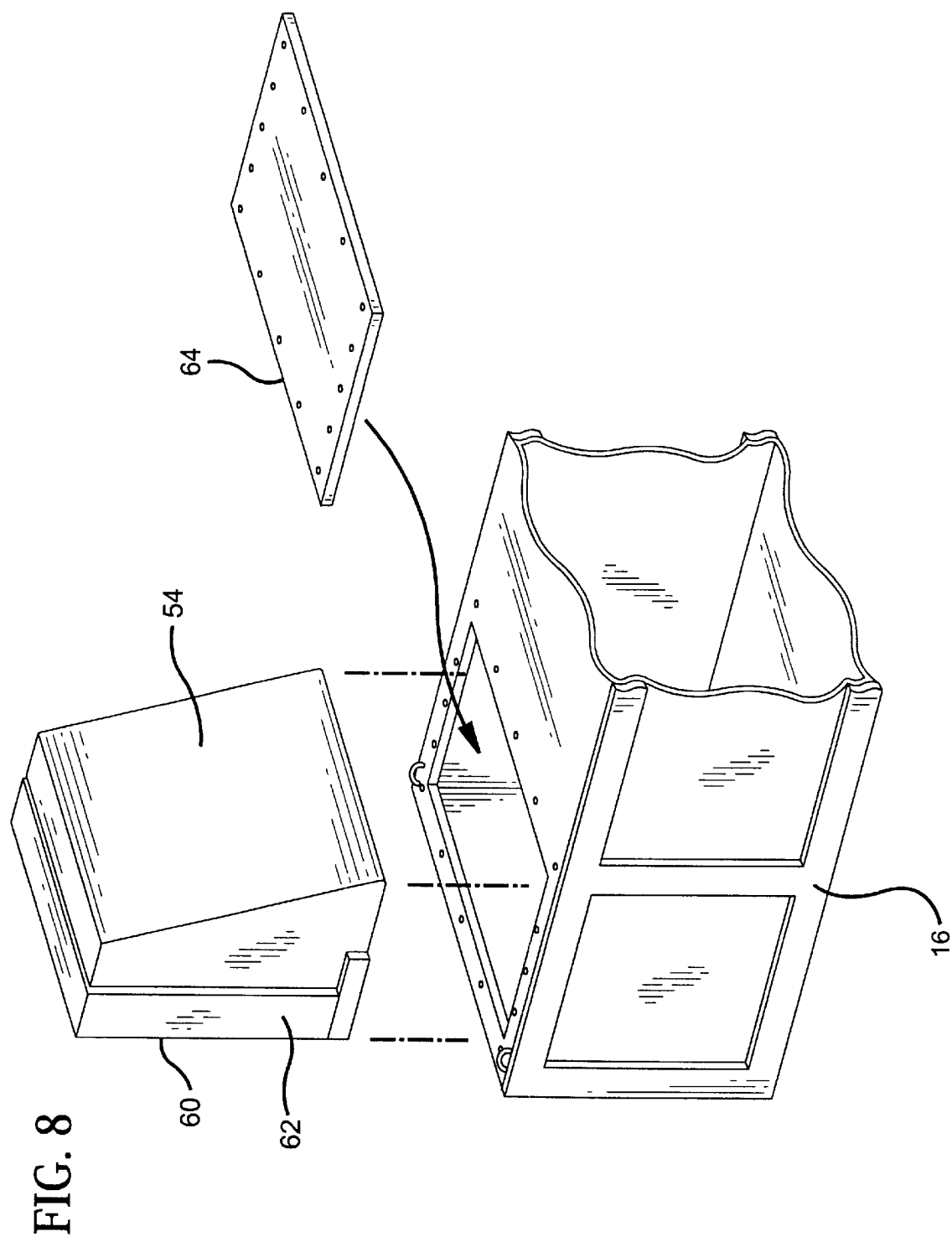
FIG. 8 is a perspective view of the preferred embodiment of the removable ejector assembly.
Figure 9:
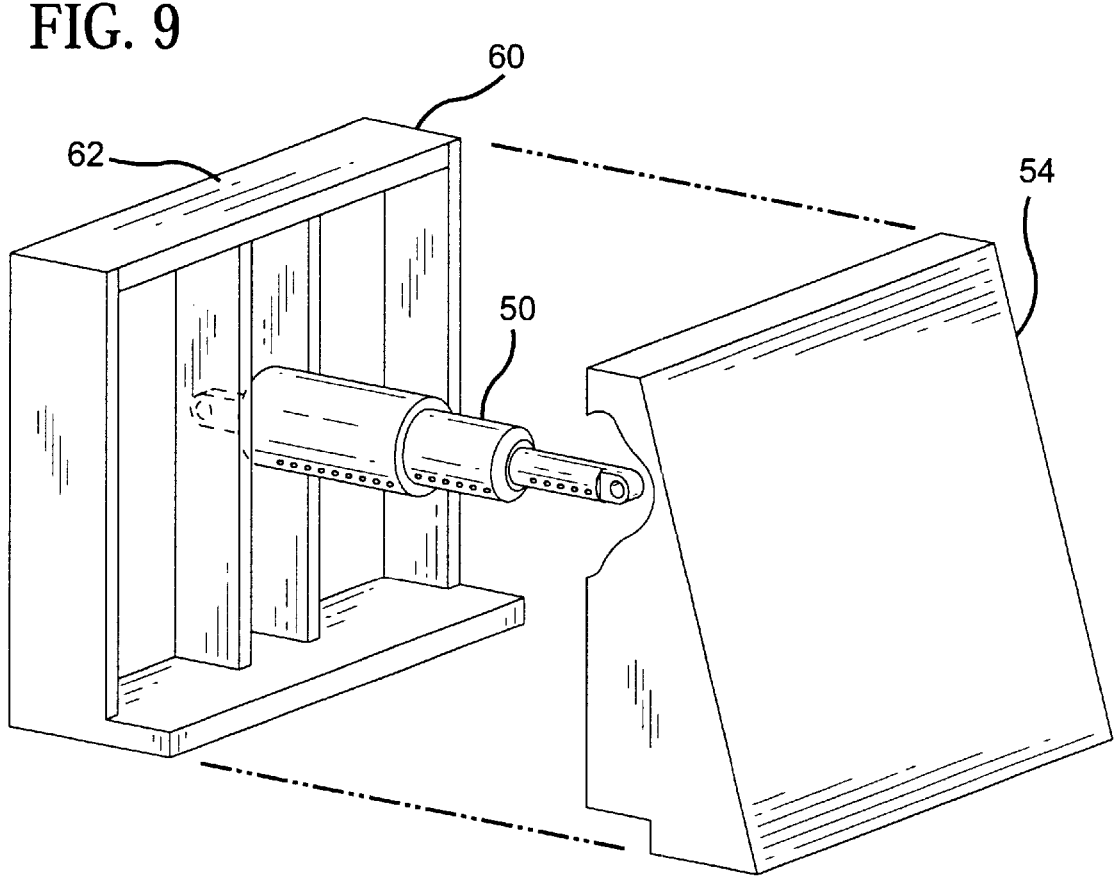
FIG. 9 is a perspective view of the preferred embodiment of the removable ejector assembly.
Figure 10:
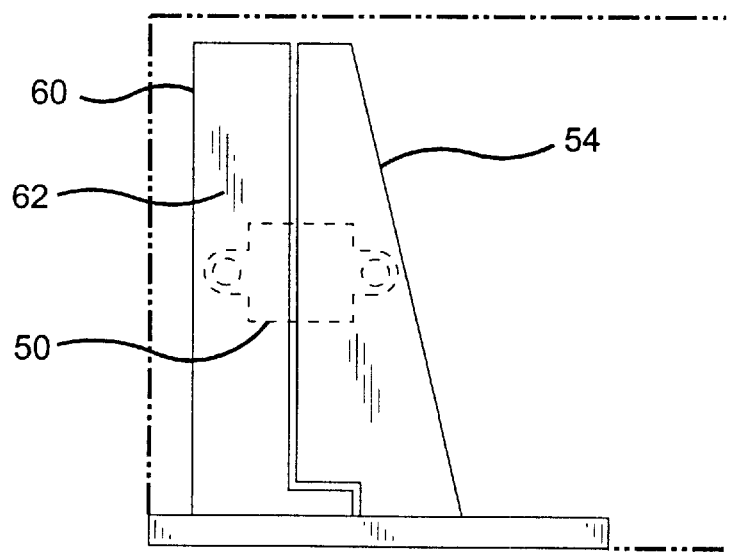
FIG. 10 is a side view of the ejector assembly shown in FIGS. 8 and 9.

In the preferred embodiment, as shown in FIGS. 8, 9 and 10, the ejector piston 50 and ejector blade 54 take the form of a removable ejector assembly 60. Here, the ejector piston 50 is secured at one end to a frame 62 and at the other end to the ejector blade 54. The frame 62 is then fastened to the front wall 52 and/or the floor of the container 16 by any conventional reasonable means. Once secured within the container, operation of the ejector assembly 60 is similar to that described above. The ejector assembly 60 can be removed from the container 16 by opening a panel 64 provided on the container and the ejector assembly can be placed in another container. By providing a removable ejector assembly 60, the costs for each individual container are significantly reduced. Additionally, malfunction of the ejector assembly 60 will not impact use of the container.

Figure 14:
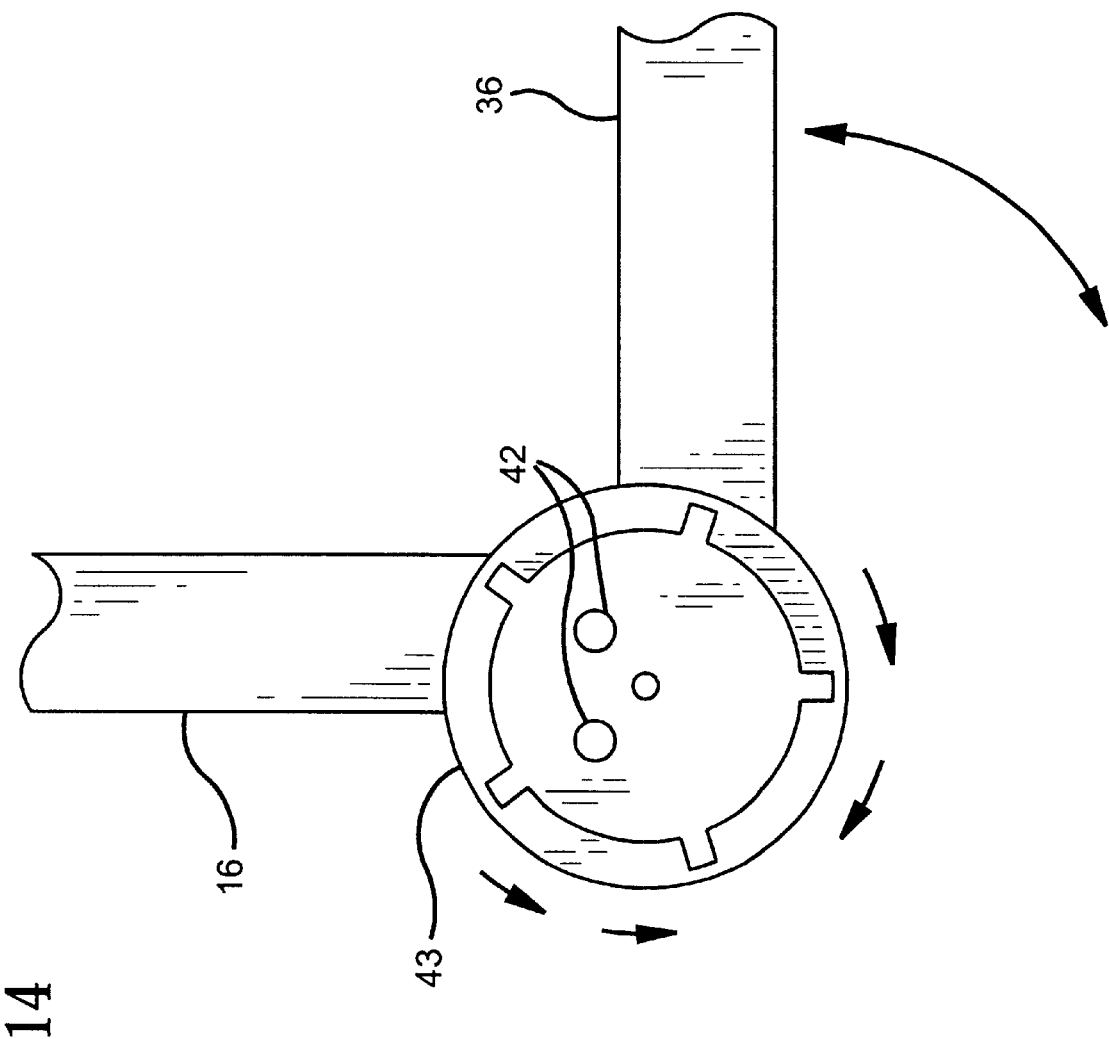
FIG. 14 is a detailed view of a hydraulic hinge of the container.

In further alternate embodiments, the container 16 may be provided with its own hydraulic pistons (not shown in FIG. 4), a hydraulic hinge 43 (a typical hydraulic hinge 43 is shown in FIG. 14) and hydraulic locks 58 for securing the inner door 30 to the outer door 31. In these alternate embodiments, hydraulic lines of the cab12 and chassis 13 are connected to the hydraulic quick connect 26 in order to activate the rear door 30. In each embodiment however, the door 30 acts as the compacting mechanism for packing the garbage into the container. Additionally, the containers may also be provided with a built in wash down system comprising water nozzles provided on the interior walls of the container to clear any loose refuse within the container during dumping and before being returned to the local container transfer station.

Figure 11:
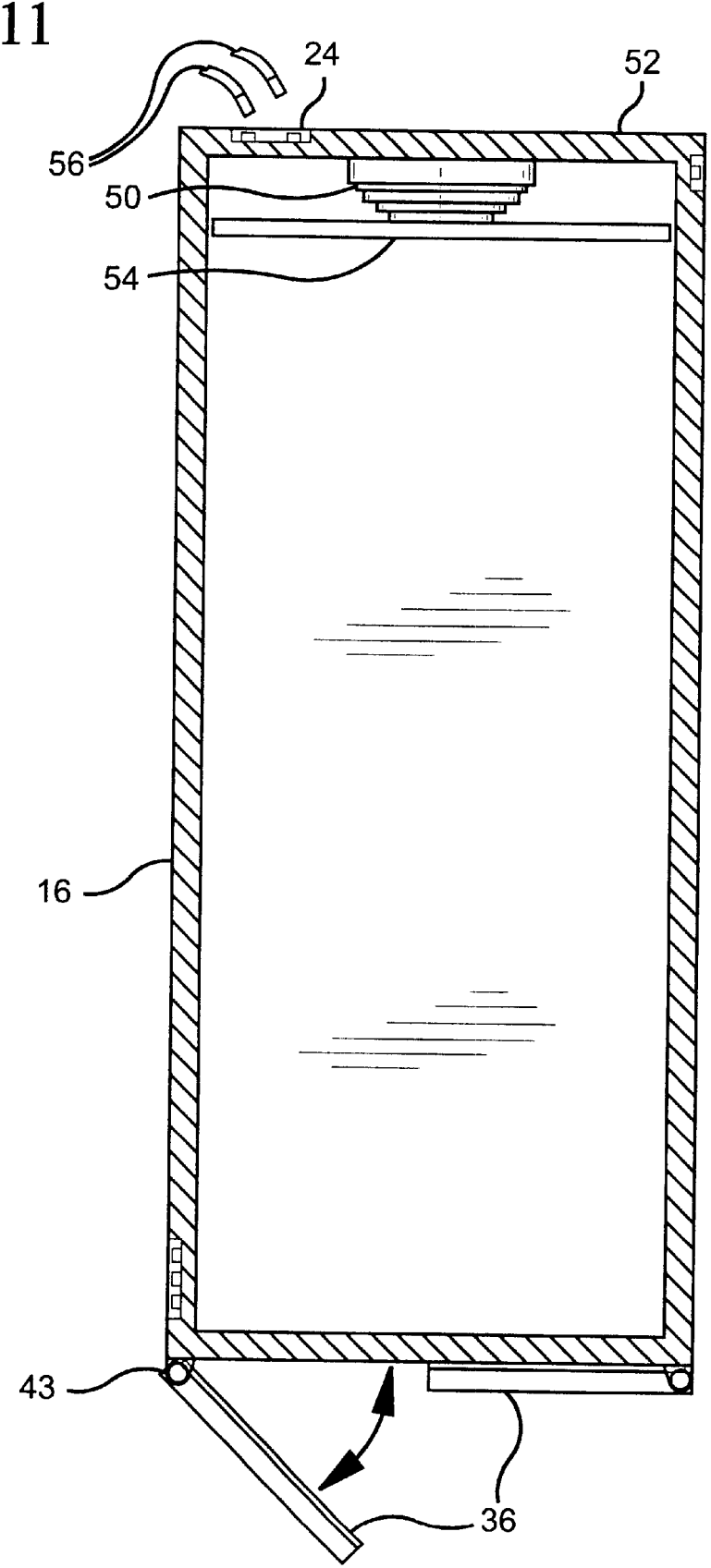
FIG. 11 is a top cross sectional view of an alternate embodiment of the container door and refuse ejector piston in a retracted position.
Figure 12:
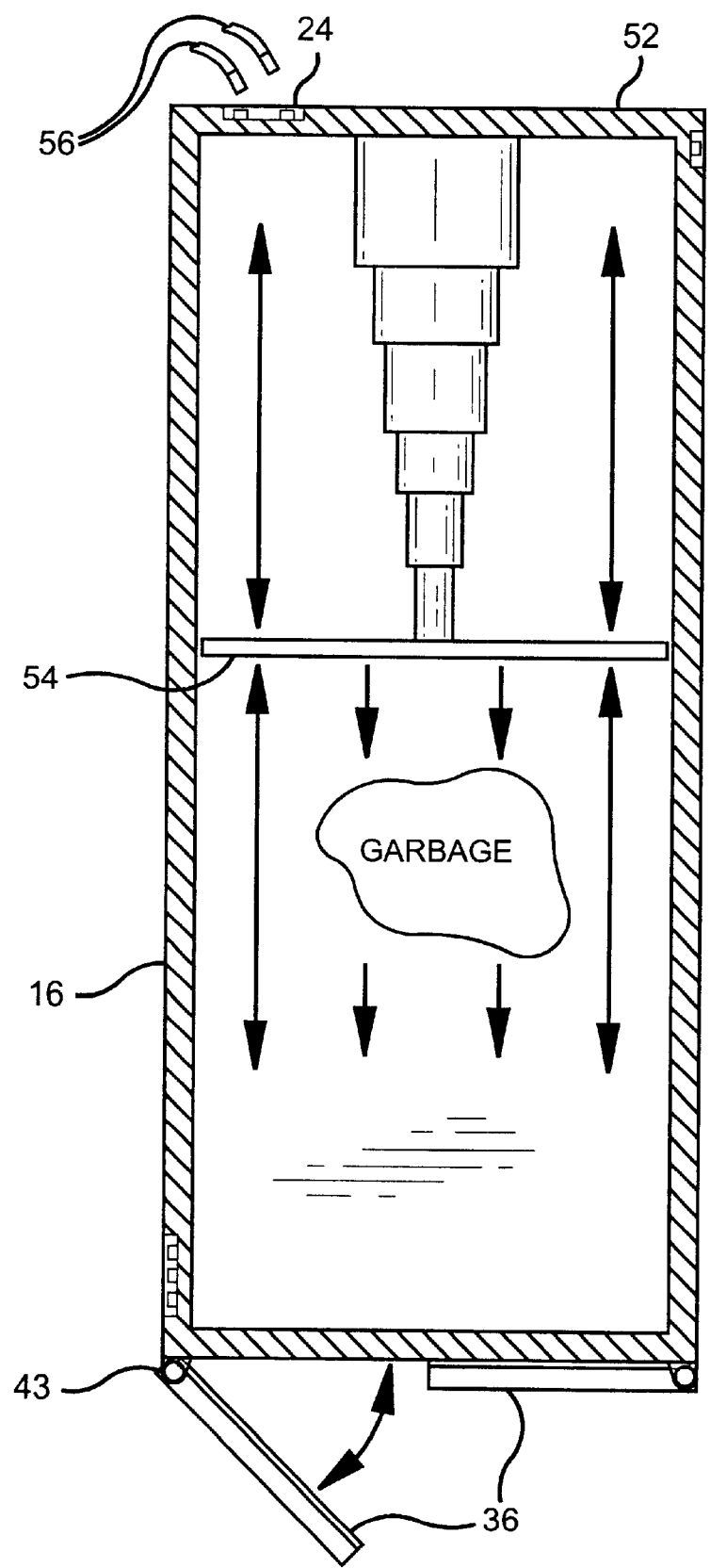
FIG. 12 is a top cross sectional view of the container shown in FIG. 11 with the ejector piston in an extended position.
Figure 13:
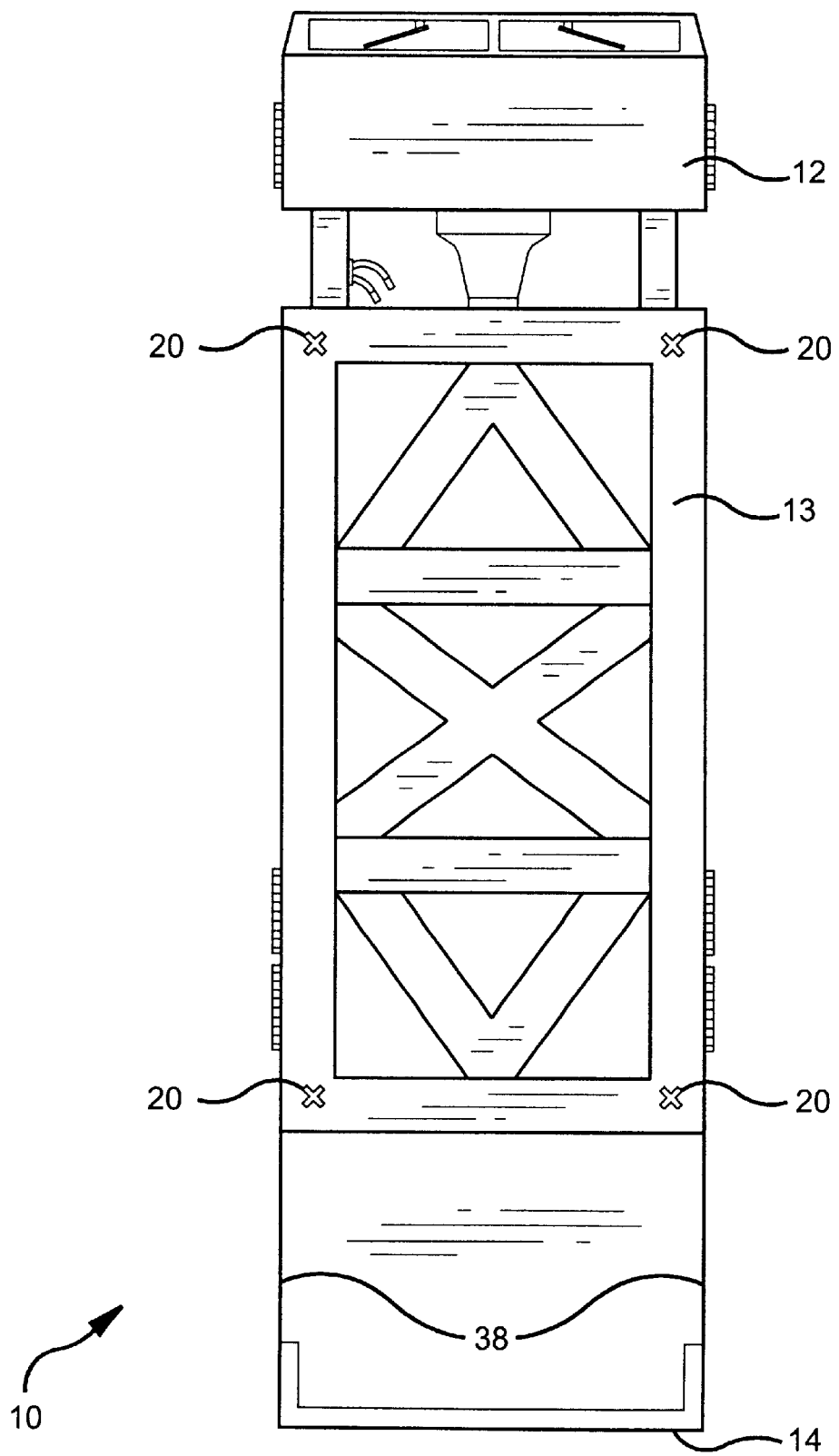
FIG. 13 is a top view of the containerized refuse collection truck of FIG. 1.

FIGS. 11, 12 and 13 show an alternate embodiment for the rear doors. In this alternate embodiment, two pivoting doors 36 are provided on the sidewalls of the container 16. The side doors 36 may be freely pivoting doors or they may be hydraulically activated through hydraulic door hinges 43 which are connected to the chassis existing hydraulic lines through quick connects 42 as shown in FIG. 14. Once the container 16 is secured to the chassis 13, the side doors 36 are swung open and are secured in recesses 38 of the rear compactor so as not to interfere with the compactor blades 44 of the rear compactor. FIG. 15 illustrates the operation of a conventional rear compactor assembly comprising a compactor blade 44 and hydraulic pistons 46, which may be utilized with a container 16 having side doors 36. As shown in FIG. 15, garbage is received in the bottom well 48 of the rear compactor and is transported to the container by reciprocating hydraulic pistons 46 and a pivoting hydraulic blade 44. Again, when the container 16 is full, the side doors 36 are closed and secured and the container may be removed from the chassis 13.

Figure 16:
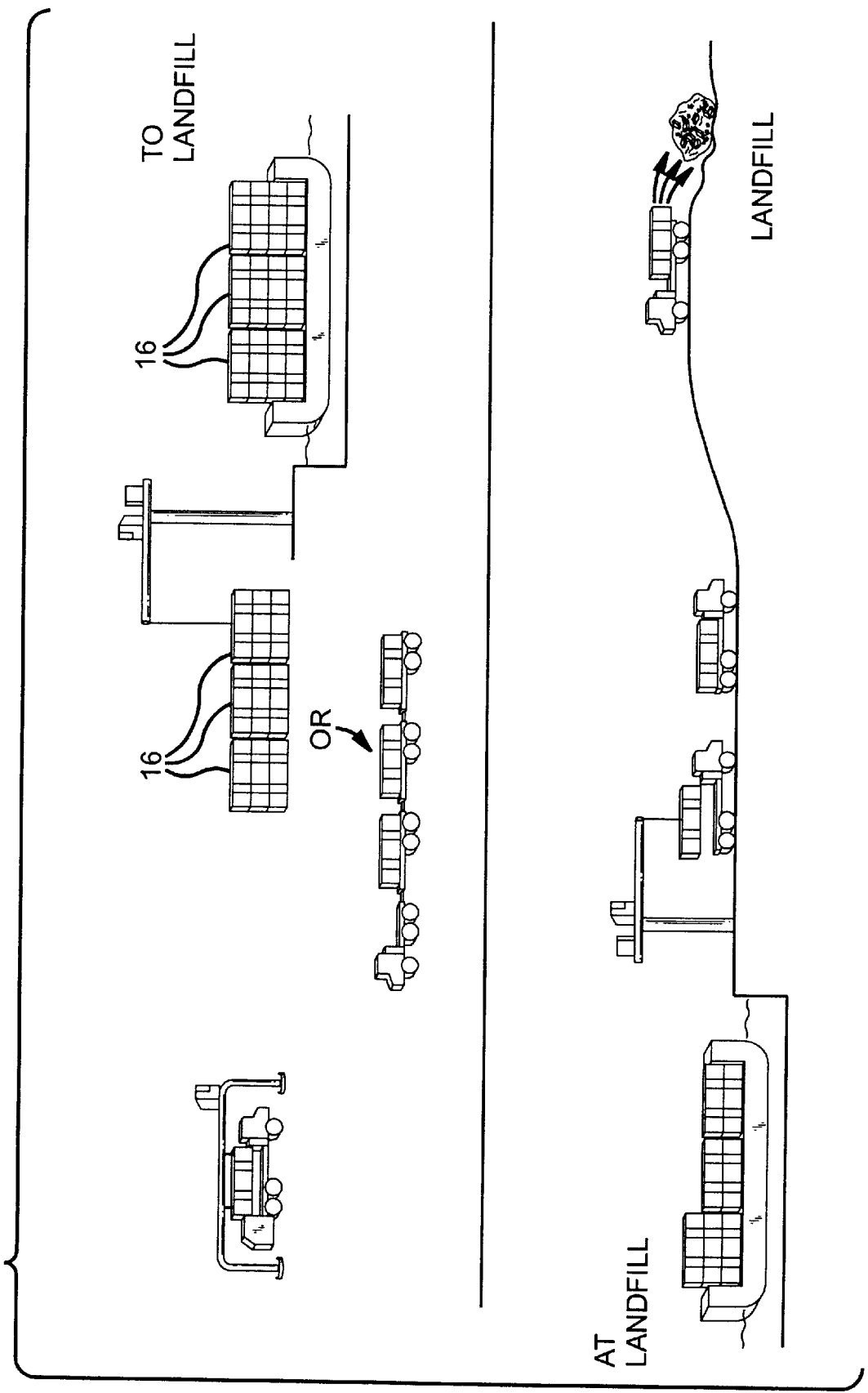
FIG. 16 illustrates the loading and unloading of the refuse containers of the present invention at a barge dock.

In use, when the refuse container is full, the truck driver may drive to a local container transfer station and the full refuse container may be removed and replaced by an empty container. Thus, the refuse collection truck may continue with its collection without significant interruption along its route. The full containers may be transported from the local container transfer stations by truck or by rail directly to a landfill or to a transport barge, as shown in FIG. 16. The containers may be loaded and stacked directly on the barge and then transferred to transport trucks at the landfill where they are emptied. The emptied containers are then returned to the local container transfer stations to be used again on the refuse collection trucks.

As a result of the present invention, an efficient refuse collection system with improved sanitary conditions is provided. Down time of the refuse collection truck is minimized by providing a removable container whereby the collection truck can continue on its route rather than transporting and dumping the refuse at a dumping site. Moreover, intermediate dumping sites and their associated expensive heavy equipment are eliminated. Finally, transporting containerized refuse eliminates the unsanitary problems with respect to odors, spillage and the congregation of seagulls and vermin.

Although the illustrative embodiments of the present invention have been described herein with reference to the accompanying drawings, it is to be understood that the invention is not limited to those precise embodiments and that various other changes and modifications may be effected therein by one skilled in the art without departing from the scope or spirit of the invention.

What is claimed:

1. A refuse collection truck comprising:
   a cab having a chassis extending rearwardly from said cab;
   a compactor unit attached to a rear end of said chassis, said compactor unit including a piston; and
   a refuse container removably attached to said chassis between said cab and said compactor unit, said refuse container including a door hingedly connected at a rear end refuse receiving opening of said container for swinging downwardly into said compactor unit in an open position, wherein said door is driven by said piston of said compactor unit from said open position for receiving refuse on said door to a closed position for compacting said refuse within said container, and wherein said door includes two upstanding side walls for clearing refuse away from said refuse receiving opening of said container by slicing into the refuse as said door moves to said closed position to aid in compaction of said refuse within said container.

2. The refuse collection truck as defined by claim 1, wherein said piston of said compactor unit is removably connected to said door of said container for driving said container door between said open and closed positions.

3. The refuse collection truck as defined by claim 1, wherein said compactor unit includes a driver door connected to said piston, said container door being seated on said driver door and being driven by said driver door between said open and closed positions.

4. The refuse collection truck as defined by claim 1, wherein said container door is hingedly connected to an outward swinging rear wall of said container.

5. The refuse collection truck as defined by claim 1, wherein said container includes an ejector assembly positioned within said container at a front end thereof for ejecting refuse within said container out through said rear end of said container.

6. The refuse collection truck as defined by claim 5, wherein said ejector assembly comprises an ejector piston connected at one end to a front wall of said container and an ejector blade connected to an opposite end of said ejector piston for pushing refuse rearwardly out through said rear end of said container.

7. The refuse collection truck as defined by claim 5, wherein said ejector assembly comprises a frame, an ejector piston connected at one end to said frame and an ejector blade connected to an opposite end of said ejector piston for pushing refuse rearwardly out through said rear end of said container, wherein said frame is releasably fastened to said container such that said ejector assembly is removable from said container.

8. The refuse collection truck as defined by claim 1, wherein said chassis includes at least one lock cooperating with at least one correspondingly sized key-hole provided on said container for alternately securing and releasing said container.

9. The refuse collection truck as defined by claim 1, wherein said container door further includes a rear wall connected between said two upstanding side walls, thereby forming a pocket for receiving said refuse.

10. The refuse collection truck as defined by claim 9, wherein said two upstanding side walls increase in height in a direction away from said hinged connection of said container door so that said side walls will slice into the refuse at said refuse receiving opening of said container as said door closes.

11. The refuse collection truck as defined in claim 1, wherein said compactor unit includes two pistons mounted on opposite sides of said compactor unit for pulling said container door into said closed position.

12. A refuse collection truck comprising:
    a cab having a chassis extending rearwardly from said cab;
    a compactor unit attached at a rear end of said chassis; and
    a refuse container removably attached to said chassis between said cab and said compactor unit, said refuse container including an ejector assembly module positioned within said container at a front end thereof for ejecting refuse within said container out through a rear end of said container, said ejector assembly module comprising a frame, an ejector piston connected at one end to said frame and an ejector blade connected to an opposite end of said ejector piston for pushing refuse rearwardly out through said rear end of said container, wherein said frame is releasably fastened to said container such that said ejector assembly module is removable from said container and installable in another container.

13. The refuse collection truck as defined by claim 12, wherein said compactor unit includes a piston and said refuse container includes a door hingedly connected to said rear end of said container for swinging downwardly into said compactor unit in an open position, wherein said door is driven by said piston of said compactor unit from said open position for receiving refuse on said door to a closed position for compacting said refuse within said container.

14. The refuse collection truck as defined by claim 13, wherein said piston of said compactor unit is removably connected to said door of said container for driving said container door between said open and closed positions.

15. The refuse collection truck as defined by claim 13, wherein said compactor unit includes a driver door connected to said piston, said container door being seated on said driver door and being driven by said driver door between said open and closed positions.

16. The refuse collection truck as defined by claim 13, wherein said container door is hingedly connected to an outward swinging rear wall of said container.

17. The refuse collection truck as defined by claim 13, wherein said container door includes one or more upstanding walls forming a pocket for receiving said refuse.

18. The refuse collection truck as defined by claim 17, wherein said container door includes two upstanding side walls that increase in height in a direction away from said hinged connection of said container door.

19. The refuse collection truck as defined by claim 12, wherein said chassis includes at least one lock cooperating with at least one correspondingly sized key-hole provided on said container for alternately securing and releasing said container.

20. The refuse collection truck as defined by claim 12, wherein said refuse container includes an opening at a front end thereof through which said ejector assembly can be removed from said container.

* * * * *